United States Patent [19]

Timsit

[11] 4,144,566
[45] Mar. 13, 1979

[54] PARALLEL-TYPE PROCESSOR WITH A STACK OF AUXILIARY FAST MEMORIES

[75] Inventor: Claude Timsit, Grigny, France

[73] Assignee: Thomson-CSF, Paris, France

[21] Appl. No.: 823,854

[22] Filed: Aug. 11, 1977

[30] Foreign Application Priority Data

Aug. 11, 1976 [FR] France .................................. 76 24555

[51] Int. Cl.² .................... G06F 7/38; G06F 13/00; G06F 15/16; G11C 9/06
[52] U.S. Cl. ........................................................ 364/200
[58] Field of Search ... 364/200 MS File, 900 MS File

[56] References Cited

U.S. PATENT DOCUMENTS

| | | | |
|---|---|---|---|
| 3,106,698 | 10/1963 | Unger | 364/200 |
| 3,287,703 | 11/1966 | Slotnick | 364/200 |
| 3,312,943 | 4/1967 | McKindles et al. | 364/200 |
| 3,537,074 | 10/1970 | Stokes et al. | 364/200 |
| 3,544,973 | 12/1970 | Borck, Jr. et al. | 364/200 |
| 3,553,654 | 1/1971 | Crane | 364/200 |
| 3,597,744 | 8/1971 | Case et al. | 364/200 |
| 3,787,673 | 1/1974 | Watson et al. | 364/200 X |
| 3,815,095 | 6/1974 | Wester | 364/200 |
| 3,970,993 | 7/1976 | Finnila | 364/200 |
| 4,065,808 | 12/1977 | Schomberg et al. | 364/200 |

OTHER PUBLICATIONS

S. H. Unger, "A Computer Oriented Toward Spatial Problems", in *Proceedings of the IRE*, vol. 46, No. 10, Oct. 1958, pp. 1744–1750.

D. N. Senzig, "Single Arithmetic Unit Vector Processor", in *IBM Technical Disclosure Bulletin*, vol. 8, No. 4, Sep. 1965, pp. 612–614.

W. Y. Dere et al., "Berkeley Array Processor", in *IEEE Transactions on Computers*, vol. 19, No. 5, May 1970, pp. 444–447.

*Primary Examiner*—Melvin B. Chapnick
*Attorney, Agent, or Firm*—Roland Plottel

[57] ABSTRACT

A parallel processor having a large number of elementary processors connected in parallel to an address bus and a control bus. Each elementary processor contains a memory and control and processing circuits to perform calculations on bits addressed in the memory and bits coming either from this memory or from a peripheral unit. Each elementary processor further contains a small capacity fast memory and the control and processing circuit contains a single storage flip-flop able to perform calculations in series on the bits extracted from the memories and/or coming from the peripheral unit. All the fast memories are parallel connected.

9 Claims, 7 Drawing Figures

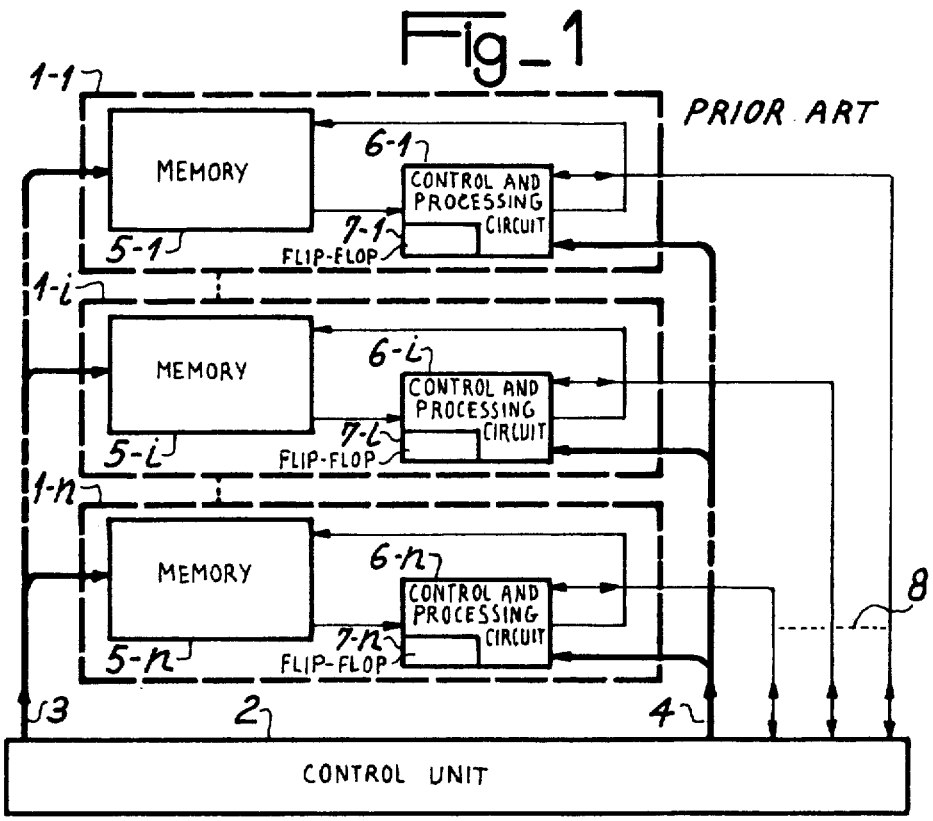
Fig_1 PRIOR ART
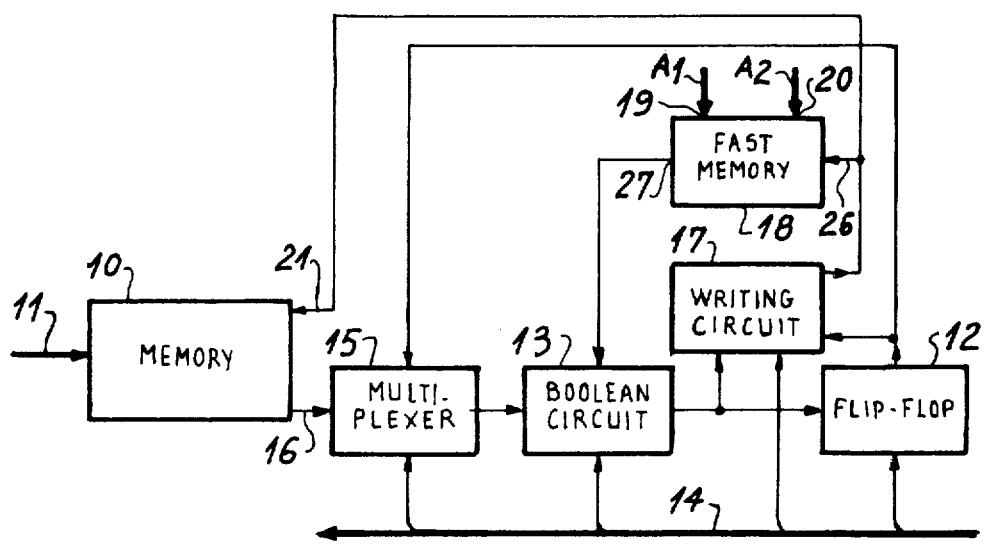
Fig_2

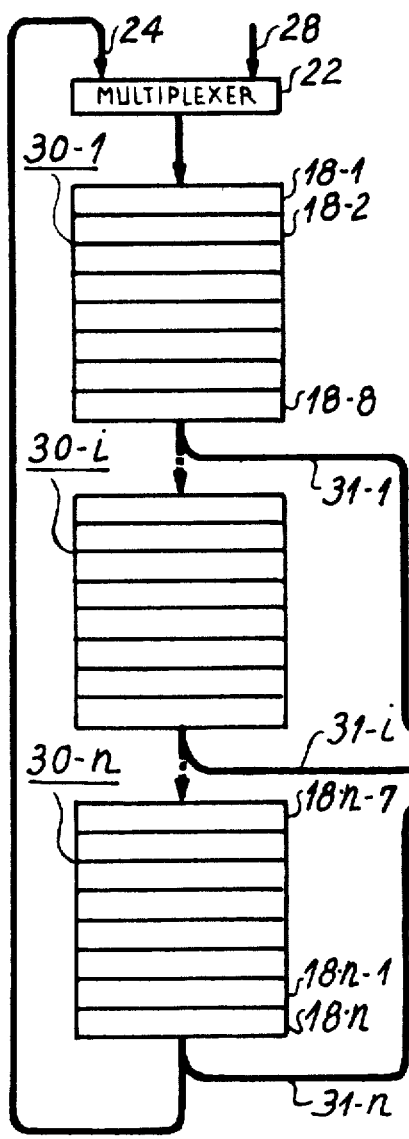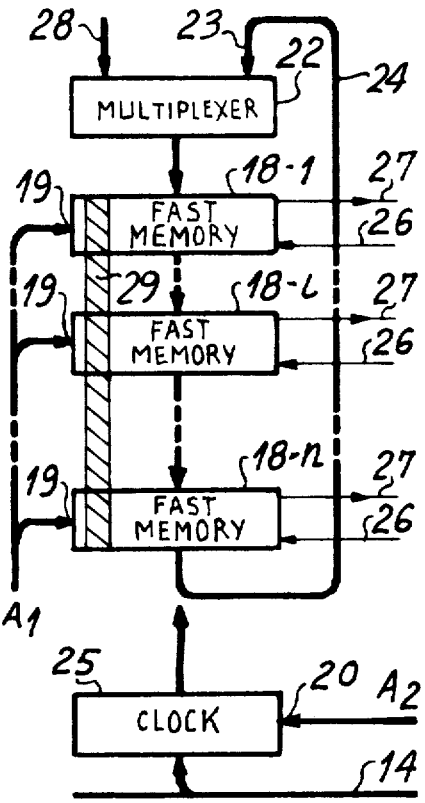

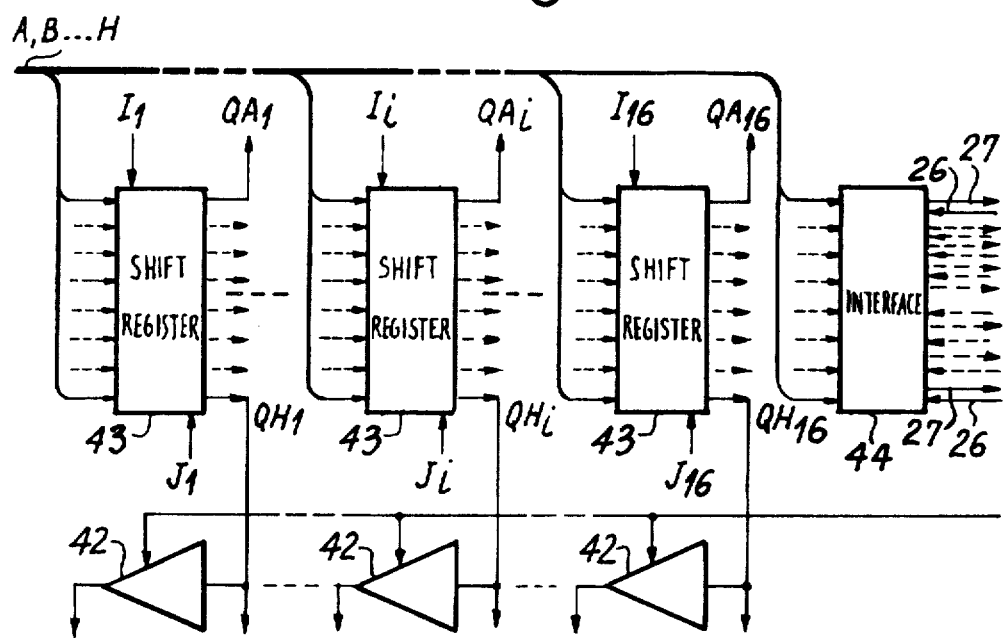
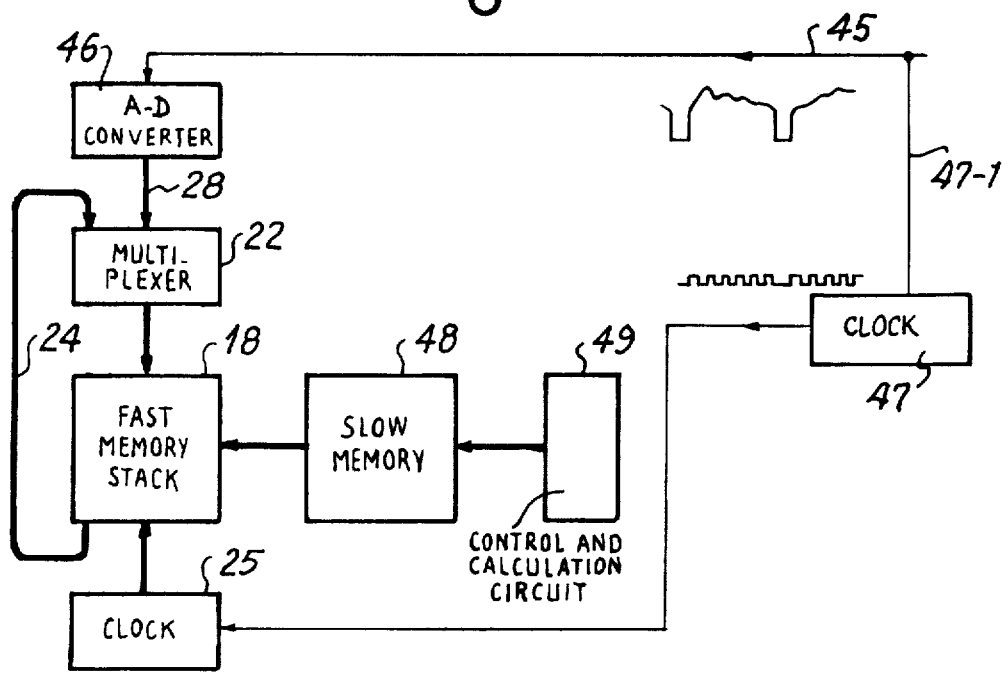

PARALLEL-TYPE PROCESSOR WITH A STACK OF AUXILIARY FAST MEMORIES

BACKGROUND OF THE INVENTION (a) Field of the Invention

The present invention concerns parallel processors used for the simultaneous and rapid acquisition and processing of very large data assemblies, for example the data contained in a video image.

(b) Discussion of the Prior Art

A parallel type processor is generally formed of a large number of elementary processors.

Each of the elementary processors contained one or several memories with a possibility of access to one bit among P bits. These memories may be R.O.M.S. or R.A.M.s with random or sequential access. In each elementary processor, the memory is associated with a logic circuit containing one or several storage flip-flops, each able to record one bit. The logic circuit also contains means enabling a certain number of Boolean operations to be performed between the various bits stored in the flip-flops and a bit addressed in the elementary processors memory. Finally, the logic circuit contains means for transferring the result of the calculation into the memory. Such an elementary processor, or word, therefore has a structure identical to that of a classical series computer and is capable of carrying out sequentially any arithmetic, Boolean or semantic calculation between the various parts of each memory in each elementary processor, provided that it is suitably managed by the various control signals and addresses which are addressed in common to all the words of the processor as a whole or of a parallel processor.

A parallel processor designed in this way can therefore perform the same calculation simultaneously in all the words and this, with identical memory addresses. Certain data may be common to all the elementary processors and, in this case, they may be transferred by the channel used for the various control signals. Hence, any operation of comparison or search equal to a common value can be carried out simultaneously on all the elementary processors. These data can also be different if the contents of the memories are used such as they are, i.e. the calculation is then carried out between two data in the very memory of each word.

In parallel processors, relatively slow memories are generally used. Therefore, to increase the speed of data processing, an attempt is made to perform several calculations simultaneously in the logic circuit of each word by providing a larger number of storage flip-flops, so that several Boolean operations can be performed in parallel between the data contained in these flip-flops and those withdrawn from the memories.

However, such an arrangement of each elementary processor only allows the processing speed to be increased in a limited way or, in other terms, the processing speed depends on the number of flip-flop circuits used, a high speed requiring a very large number of flip-flops and therefore being excessively expensive.

SUMMARY OF THE INVENTION

The purpose of the present invention is to increase considerably the processing speed in a parallel processor with only a slight complication of the circuitry which does not greatly increase the cost of the whole system.

Accordingly, there is provided a parallel type processor comprising elementary processors connected in parallel to an address bus and a control bus, each of the elementary processors comprising; a memory unit; a fast memory, having a lower capacity and a lower access time than the memory unit; a single storage flip-flop; control and calculation means for performing calculations on two bits extracted on the one hand, from either the memory unit or the flip-flop and, on the other hand, from the fast memory, the result of the calculation being written in the flip-flop and, simultaneously, either in the memory unit, or in the fast memory.

Other characteristics of the invention will appear in the course of the description which follows which is given solely as an example. It refers to the drawings attached in which:

BRIEF DESCRIPTION OF THE DRAWINGS

FIG. 1 shows a diagram of a parallel processor in accordance with prior art;

FIG. 2 is a schematic diagram of an elementary processor used in a parallel processor according to the invention;

FIG. 3 shows a schematic diagram of the interconnection between the fast memories of all the elementary processors forming the parallel processor in accordance with the invention, the other logic circuits and slow memories not being shown;

FIG. 4 is a schematic diagram of the grouping of the various fast memories in the parallel processor in accordance with the invention, for quick reading operations;

FIG. 6 is another embodiment of the diagram shown on FIG. 4;

FIG. 7 is a diagram of a particularly interesting application of a parallel processor in accordance with the invention.

DESCRIPTION OF THE PREFERRED EMBODIMENT

Figure 2A:
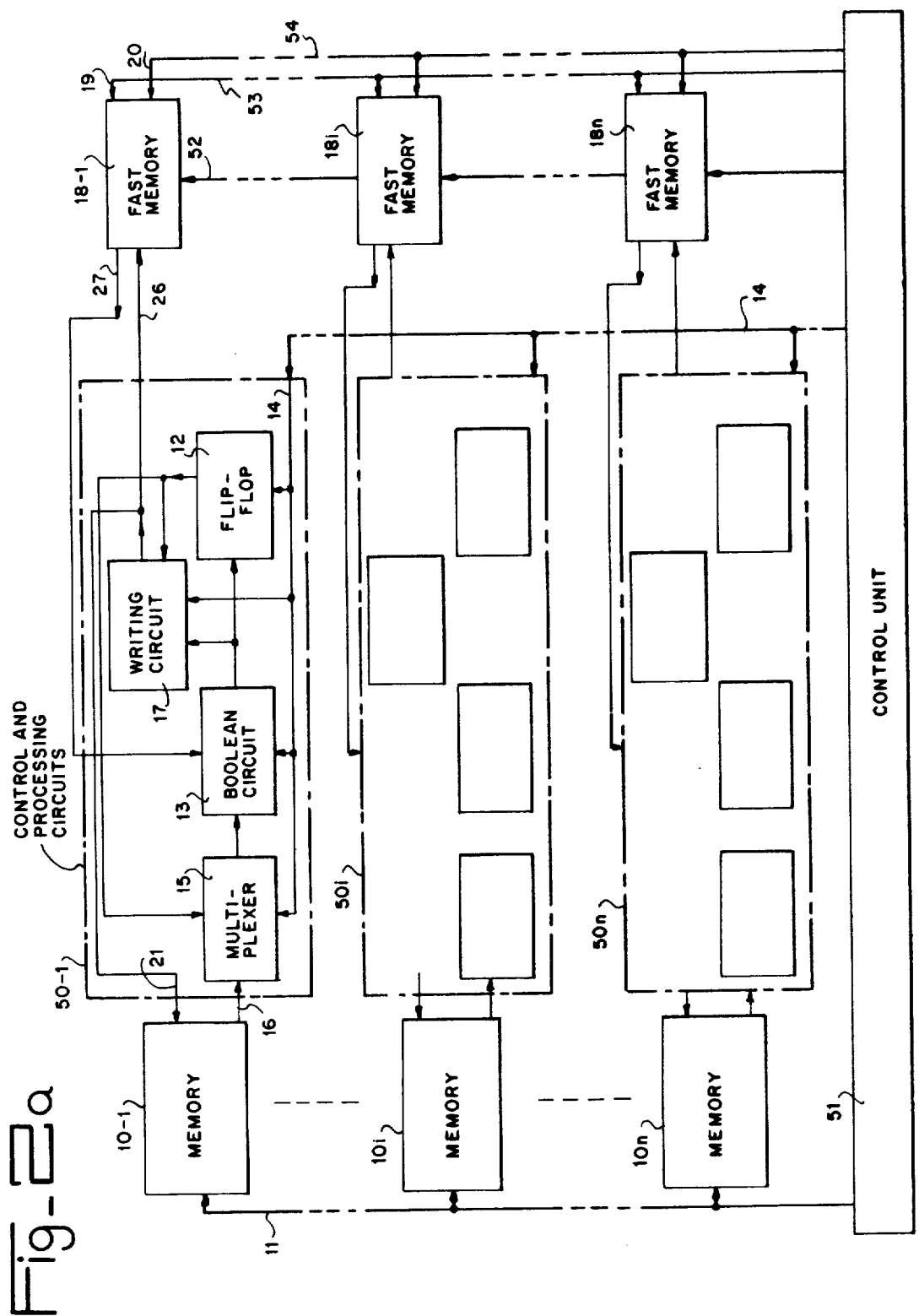
FIG. 2a is a schematic drawing of the parallel processor of FIG. 2 when incorporated in the structure shown in FIG. 1.

On FIG. 1 a classical prior art parallel processor is shown. This processor has a large number of elementary processors $1-1, 1-i \ldots 1-n$, which are connected, in a computing assembly, to a control unit 2 from which leave an address bus 3 and a control bus 4 that are common to all the words $1-i$.

Each of these processors $(1-i)$ contains one or several memories $5-i$ with an access to one bit among P bits. These memories are designed in the form of R.O.M.s or R.O.M.s with random or sequential access. Such a memory with a relatively large capacity is necessarily rather slow (addressing time 1 µs with a capacity of P = 1 to 16 K bits for example).

Each memory $5-i$ is connected to a control processing logic circuit $6-i$ in whch are provided one or several data storage flip-flops $7-i$, each enabling one bit to be recorded in this logic circuit $6-i$ and various calculation operations, the application of Boolean functions in particular, to be carried out on them and on the bit addressed in the memory. Logic circuit $6-i$ is also able to transfer the results of these calculations to memory $5-i$.

So that it can be subjected to input/output operations, the parallel processor is provided with an input- /output data bus 8 connected to the control unit 2. This bus 8 may be designed in two ways:

(1) parallel inputs and outputs; in this case, writing or reading is done bit after bit on an n-bit data bus.

(2) associative inputs and outputs; in this case, each word is able to perform a write operation in its own memory 5−i which is dependent upon the value of a bit contained in a storage flip-flop 7−i (conditional write operation). Thus it is then possible to look for the words corresponding to a specific condition (for example, the equality of certain bits), to transfer the result to the storage flip-flop and to write a value in the memory, this being done bit after bit by means of the conditional writing system in the parallel processor words thus activated.

The associative reading operation classically is a conditional reading operation which depends upon the value contained in the flip-flop of each elementary processor, that value representing a condition which is, or is not, fulfilled. For the whole processor, the associative reading operation can be performed by means of an "OR" gate connected to all the storage flip-flop outputs of all the processors. Thus, the memory of each selected elementary processor, can be read bit after bit.

If an operation of writing or loading of a memory 5−i is considered from a peripheral unit delivering, for example, parallel data on 16 bits in M words of the parallel processor, for the time (T) that the operation will take there are:

(a) M address searches on at least N bits (such that $2^N = M$), (b) 16 × M write operations, i.e.

$$T = (Mn = 16M)t$$

or

T > M . 16t (neglecting the first term MN)

where t represents the access time to a slow memory 5−i. Taking M = 256 for example and an access time t, which is about 1 μs for an MOS memory, the loading operation will take a time T≈6,000 μs, which is relatively slow, at least in the application the invention deals with.

FIG. 2 shows a simplified schematic of a single elementary processor in a parallel processor according to the invention. This processor includes a large capacity memory 10 which may be identical to those used in a prior art processor. It may have a capacity of 1 to 16 K bits for example and is addressed through an address bus 11. The elementary processor contains only one storage flip-flop 12 whose input is connected to the output of a Boolean circuit 13 for example, a SN 74-181 as described in the Texas Instruments catalog producing a Boolean function with two variables. A control bus 14 is connected to these two circuits and, in particular, enables a function with two variables to be chosen in the circuit 13. The output of the storage flip-flop 12 is connected to an input of a multiplexer 15 whose other input is connected to the reading output 16 of the memory 10. Multiplexer 15 may comprise, for example, a SN 74-157 as described in the Texas Instruments catalog. The output of the multiplexer 15 is connected to the first input of the Boolean circuit 13. The latter's output is connected to a writing circuit 17 which receives instructions from the control bus 14 and the flip-flop 12.

In accordance with the invention, a fast memory 18, with two addresses and of small size (8 or 16 bits for example) is also provided. This memory has two address inputs 19 and 20 and is connected for reading to the second input of the Boolean circuit 13 on the one hand and for writing to the writing circuit 17 on the other hand. Also, the output of the writing circuit 17 is connected to the writing input 21 of the slow memory 10.

Thanks to this assembly, operations can be performed very quickly with only one storage flip-flop 12, for example:

(1) an operation of 3 address type:

(A₁) F (M) → B, A₂

(A₁) F (M) → B, M, A₂

(2) an operation of 2 address type:

(A₁) F (B) → B, A₂

In these operations the following symbolic notations are used:

(A₁) represents the bit contained in the fast memory 18 with address A₁;

(M) is the bit contained in the slow memory 10 with address M;

(B) is the bit contained in the storage flip-flop 12;

F represents the two-variable Boolean function produced in circuit 13 and chosen using control bus 14;

→ represents the write function determined in circuit 17 and also chosen by control bus 14.

It can be seen that, thanks to the insertion of fast memory 18 in each elementary processor of the parallel processor, it is possible, at the level of each word, to produce an address for slow memory 10 and then, during the access time for this memory to carry out all the intermediate calculations with an instruction of the type:

(A₁) F (B) → A₂, B

Thus, through a single storage flip-flop (12), the volume of calculations performed can be quite large due to the addition of a simple fast memory (18) only for example during the time of access to slow memory 10.

FIG. 3 shows a special method of interconnection of the fast memories in all the elementary processors in the parallel processor. As shown, it can be seen that memories 18−1, . . . 18−i. . . . 18−n are connected in a stack. This stack's input is connected to a multiplexer 22 whose inputs 23 are connected to the stack output through conductor 24. Multiplexer 22 may comprise, for example, a SN 74-150 as described in the Texas Instrument catalog. The various clock signals passed to the stack are produced by a clock generator 25 which receives, through address bus 20, the address signals A₂ and the instructions from instruction bus 14.

Each memory 18 contains, as in FIG. 2, a write input 26 and a read output 27. Also, each memory has an addressing input 19 for address signals A₁.

Multiplexer 22 is provided with a series of second inputs 28 for loading data in the elementary processors 1−1, 1−2, to 1−n.

The assembly in FIG. 3 makes it possible to make the write operations described above with respect to FIG. 1 even faster. The bits with the same address (shown by the shaded area 29 in FIG. 3) in all the fast memories 18−i may be shifted upwards or downwards simultaneously from a stage in the stack, with the possibility of feed-back by the conductors 24, or receive external input signals thanks to the presence of multiplexer 22. This shift may occur in one column, in several or in all at once using clock generator 25 which receives address signals $A_2$ and the signals from control bus 14.

By means of this assembly, the loading time for data coming from outside (inputs 28) and intended to be fed into memories 10−i (not shown in FIG. 3) is much reduced:

$T' = M \cdot t' + 16 t$ in which T' is the time required to obtain a shift of one stage in the stack in the presence of input signals.

If $t' \approx t/5$, i.e. the time of access (t') to stack 18−1 to 18−n in FIG. 3 is five times less than the time of access (t) to memories 10−1 to 10−n in FIG. 1, then $T' \approx (M/5) t + 16 t$ With respect to the classical assembly without fast memories, there is a time gain:

$$\frac{T}{T'} > \frac{16 M t}{(16 + \frac{M}{5}) t},$$

a ratio which tends towards 80 for a value of M of 1,000 for example. It is evident that this is a great advantage with respect to the classical technique and makes it possible to consider special applications of the invention as will be seen in what follows.

On FIG. 4, an other embodiment of the assembly of the fast memory stack is shown, which is intended to make the reading of data easier in the stack of fast memories. In this assembly, the stack is divided into blocks 30−1, 30−2, ... 30−i, ... 30−n, each containing a given number (eight in this case) of fast memories 18−i. Each block 30−i is associated with an addressable output 31−i and all of these outputs 31−1 ... 31−n can be subjected to a half-sequential and half-random access. For this purpose the outputs are connected to an addressing circuit 32 which may be a multiplexer, an open collector circuit or a three-state logic circuit. The addressing circuit 32, addressed by a bus 36−a, has an output 33 connected to the control unit 34 of the whole system, and on it appear the data read. Addressing circuit 32 may comprise a multiplexer, for example, sixteen SN 74-151 circuits connected in parallel. The bits of output 33 may then be multiplexed in a multiplexer 35 by an address input 36−b in order to allow the test of one bit on an elementary output 37 of the multiplexer 35, the bit having a given geographical position in the stack of fast memories. Programmed or automatic shifts can also be made in it until the test corresponds to the value chosen at the output 37. Multiplexer 35 may comprise a SN 74-150, as shown in the Texas Instruments catalog.

These programmed shifts may correspond, for example, to an operation testing the $n^{th}$ bit in the $p^{th}$ memory block which causes the carrying out of one of two different instructions, as a function of the result of the test. They may also correspond to a shift operation in the memory stack by means of an internal or external clock until the $n^{th}$ bit in the $p^{th}$ block is equal to 1 or 0. The clock may then act on clock 25 (FIG. 3) which controls the shift of data in the stack.

Figure 5:
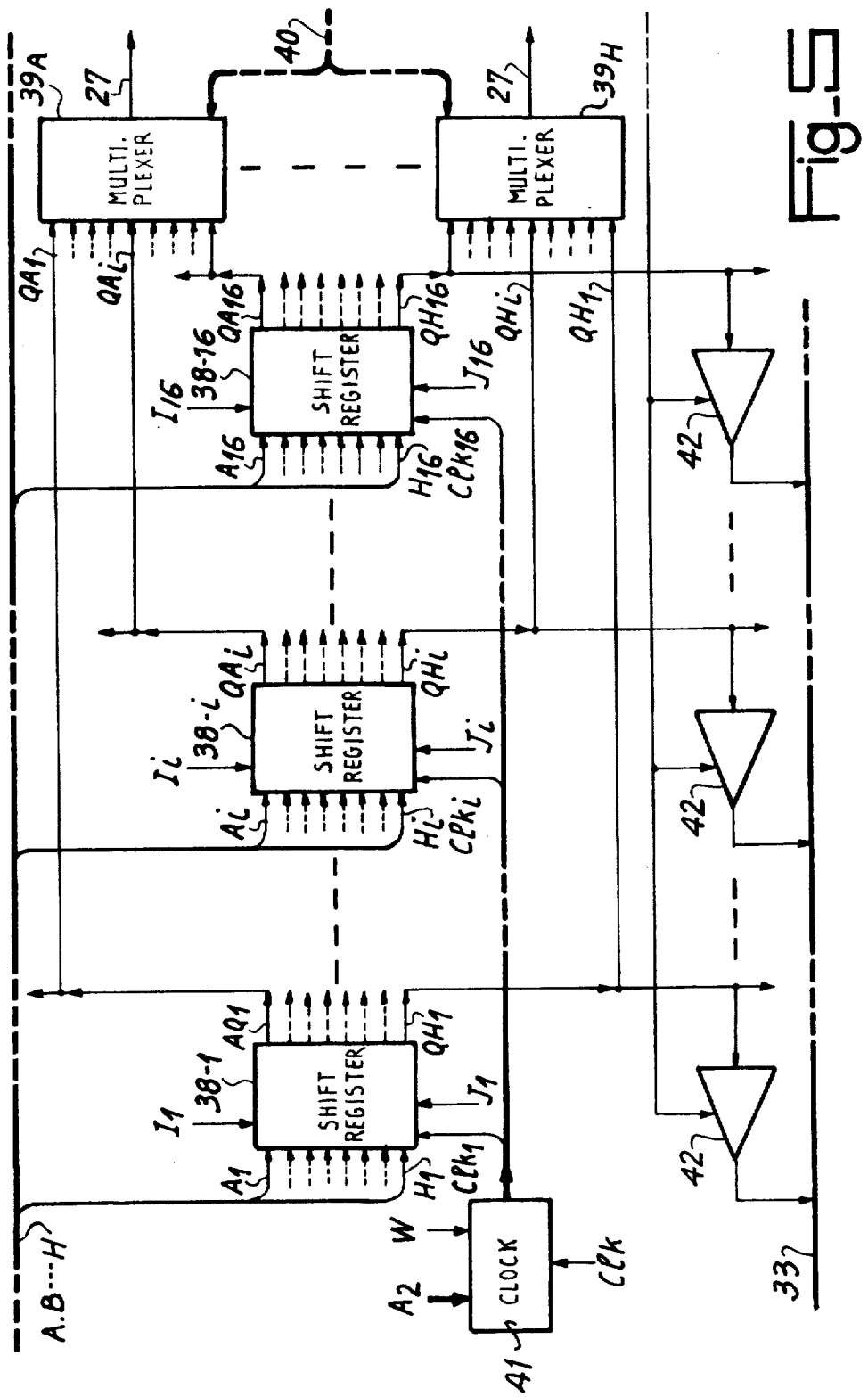
FIG. 5 is an actual embodiment of the diagram shown on FIG. 4.

In FIG. 5 is shown a first practical assembly of a stack of fast memories which may be used for the circuit in FIG. 4, and shows for example one block (30 on FIG. 4) of eight fast memories each of sixteen bits. The assembly shown contains, in each block, sets of sixteen shift registers 38−1 to 38−16, with eight parallel inputs A, B, C, ... H. The inputs of the same name ($A_1$, $A_2$, ... $A_{16}$ or $B_1$, $B_2$ ... $B_{16}$ for example) are arranged in rows and connected together to an input bus A, B, ... H. Each shift register 38 has eight outputs QA ... QH. The outputs of the same name ($QA_1$, $QA_2$, ... $QA_{16}$ or $QB_1$, ... $QB_{16}$ for example) are connected respectively to the inputs of eight multiplexers $39_A$ ... $39_H$. Each multiplexer 39 has an output 27 (FIG. 3) and multiplexes one channel out of its sixteen inputs. Multiplexers 39 are connected to an address bus 40 giving reading access to one of the 16 bits of each of the eight fast memories of the block shown on FIG. 5. The shift registers may be TTL units of type SN74198 while the multiplexers are for example TTL units of type SN74150 and described in the Texas Instruments catalog.

A clock signal distribution circuit 41 connected to clock inputs Clk1, ... Clk16 of each of shift registers 38, enables writing to be done in one column of the block (whose address is $A_2$), upon a write instruction (input W), by sending an appropriate clock signal (Clk) to the column considered. The clock circuit can transmit a signal to a single input Clk1 to Clk16 or to all of them simultaneously. The clock signal Clk can be received from outside (as shown on FIG. 5) or generated in the clock circuit itself.

In the same way, to obtain a shift of one or several columns, a shift instruction "upwards" or "downwards" should be placed at the corresponding inputs ($I_1$ ... $I_{16}$ downwards and $I_1$ ... $I_{16}$ upwards) and outputs ($QA_1$ ... $QA_{16}$ and $QH_1$ ... $QH_{16}$) of the shift registers and the clock signal should be applied to the shift register or registers concerned.

Hence a two-address system is obtained, one being for reading and the other for writing or shifting.

The reading system addressed by blocks can be made by using three-state gates 42 connected to the last stage of the stack only, the outputs of these gates 42 being connected to bus 33 (FIG. 4).

FIG. 6 shows another practical example of production of the invention in which each block in the fast memory stack is made from shift registers 43 of the three-state type (for example, type No. SN74-299 and described in the Texas Instrument catalog.

These registers are connected in a similar way to those in FIG. 5. However, they are connected to a storage interface 44 of a bidirectional bus, to ensure reading of the data. This circuit may be of the AM 29-07 type for example and described in the A.M.D. catalog.

The assembly in FIG. 6 allows economy of circuits but it results in management which is a little more complicated. It is then necessary when reading to validate the output of one of the shift registers 43, to obtain reading through the interface of bidirectional bus 44 and then, when the data have been processed, to return the result to the bus interface together with a write clock pulse to the interface while a write clock pulse is passed to the shift register unit corresponding to the column addressed.

The use of a parallel processor for the image calculation is very interesting- it is possible to compute simultaneously a large number of points forming an image. For example, the following can be mentioned: the operations of spatial filtering of the calculation of an image mean, the operations of shape recognition, the storting of objects as a function of their difference with respect to a standard object recorded in the memory, etc.

Thanks to the invention, it is possible to perform these operations in real time. For example, thanks to the fast action of the memory stack, it becomes possible to process a video image.

FIG. 7 shows a simplified schematic diagram of an assembly enabling such a process to be carried out. A video signal 45 is applied to a fast analog-digital converter 46. The data, converted to digital form, are passed to multiplexer 22 and from there to memory stack 18−1 to 18−n to be fed into the first memory in the stack (i.e. into the first word of the parallel processor). In the stack, the action of an external clock 47 enables the data to be shifted downwards during a line of the vido signal coming from a camera, clock 47 being shychronized on this video signal connection, 47−1 in the drawing. During the time reserved for the synchronizing of this signal, the video data, which have been converted to digital form, are transferred column by column in a slow memory 48 of the assembly, using the control and calculation circuits 49 similar to circuits 6−1 to 6−n in FIG. 1.

The extraction of video images from the memories can be done in a similar way. During the time reserved for shychronizing, the transfer from the slow to the associated fast memories is performed and then, for the length of an image line, the fast memory stack can be shifted thanks to the external clock. The ddigital values thus obtained are addressed to a digital-analog converter folloed by a synchronizing circuit to give a complete video image signal at the output.

What I claim is:

1. A parallel-type processor comprising a plurality of elementary processors connected in parallel to an address bus and to a control bus, each of said elementary processors comprising:

a memory unit having an input and an output;

a fast memory unit having an input and an output, said fast memory unit having a lower access time than said memory unit; and control and calculation means, comprising a single storage flip-flop, said control and calculation means being connected to the input andd output of said memory unit and to the input and output of said fast memory unit, for performing calculations on two bits extracted from the group of units formed by said memory unit, said fast memory and said storage flip-flop, the result of said calculations being written in one of the units of said group, the fast memory units of all of said elementary processors being connected together to form a stack for simultaneously translating any data from any word to the adjacent word, said stack having an input and an output and defining rows and columns of data, said parallel type processor further comprising a multiplexer having one set of outputs connected to said stack input and two sets of inputs, the first of them being connected to said stack output while the second set of inputs is connected to receive data from a souce extenal to said processor.

2. A parallel-type processor as claimed in claim 1 further comprising a clock generator, said generator being connected to said stack to control the shifting of data contained in the columns of said stack, under control of address signals and control signals from said control bus.

3. A parallel-type processor as claimed in claim 2 wherein each fast memory unit comprises a shift register, said processor further comprising a plurality of additional multiplexers for the reading of said shift registers. said 4. A parallel-type processor according to claim 2 wherein each fast memory unit comprises a three-state logic shift register, said processor further comprising an input/output interface for reading and writing data in said stack, said interface being connected to the rows of said stack.

5. A parallel-type processor as claimed in claim 1 wherein said fast memory units are grouped in said stack to form functional blocks of memory units, said processor further comprising an addressing circuit having an input and an output, each block in saidd stack being associated with an intermediate output of the last fast memory unit in each block and said addressing circuit to perform reading, by blocks, of the data stored in said stack.

6. A parallel-type processor according to claim 5 further comprising a multiplexor connected to said addressing circuit output for the testing of an individual bit situated in any position in the memory units comprising said stack.

7. A parallel-type proccessor according to claim 2 further comprising an internal clock circuit, said clock generator being connected both to said internal clock circuit and to the external clock circuit of any peripheral unit which may be connected to said processor.

8. A parallel-type processor according to claim 2 further comprising an analog-to-digital converter for receiving signals representative of an image, said fast memory units being connected to said converter for an analysis of said image.

9. A parallel-type processor according to claim 8 wherein said images are video images comprising modulated scanning lines and accompanied by image synchronizing pulses, said processor further comprising means for inputting and outputting the data comprising each of the lines of said image during said synchronizing pulses.

* * * * *